United States Patent
Lin (10) Patent No.: US 6,863,527 B2
(45) Date of Patent: Mar. 8, 2005

(54) PERSONAL HEATER

(76) Inventor: Arlo H. T. Lin, Akara Building, 24 De Castro Street, Wickhams Cay I, Road Town, Tortola (VG)

( * ) Notice: Subject to any disclaimer, the term of this patent is extended or adjusted under 35 U.S.C. 154(b) by 113 days.

(21) Appl. No.: 10/403,372

(22) Filed: Mar. 31, 2003

(65) Prior Publication Data

US 2004/0191717 A1 Sep. 30, 2004

(51) Int. Cl.$^7$ .............................................. F23D 14/46
(52) U.S. Cl. ....................... 431/345; 431/153; 431/344; 431/75; 431/83; 126/401
(58) Field of Search ................................ 431/345, 344, 431/153, 255, 75, 77, 83, 84; 126/401, 403, 406; 251/11; 236/101 R; 219/222

(56) References Cited

U.S. PATENT DOCUMENTS 4,382,448 A * 5/1983 Tittert ......................... 126/409
5,800,154 A * 9/1998 Henninger et al. ........... 431/75

FOREIGN PATENT DOCUMENTS

GB          1539637 A   *  1/1979   ........... F16K/31/00
GB          2104594 A   *  3/1983   ........... F02M/31/06

* cited by examiner

Primary Examiner—Jiping Lu
(74) Attorney, Agent, or Firm—Alan D. Kamrath; Nikolai & Mersereau, P.A.

(57) ABSTRACT

A heater includes a handle, a combustion chamber, a valve and a thermal controller. A reservoir for fuel can be installed in the handle. The combustion chamber is mounted on the handle. The valve is received in the handle. The valve defines a passage through which fuel can flow from the reservoir into the combustion chamber for combustion. The thermal controller includes a memory element at least partially received in the combustion chamber and a rod connected between the memory element and the valve for controlling a rate at which fuel can flow through the passage defined in the valve based on the temperature in the combustion chamber. The memory element is a helical memory metal element. The memory element shrinks or expands when the temperature increases above a certain value.

19 Claims, 9 Drawing Sheets

PERSONAL HEATER

BACKGROUND OF INVENTION

1. Field of Invention

The present invention relates to a personal heater and a valve for use in the same.

2. Related Prior Art

U.S. Pat. No. 5,800,154 discloses a gas-heated appliance for personal use including a fuel gas reservoir, a combustion chamber, and a valve assembly disposed between the fuel gas reservoir and the combustion chamber for controlling and/or regulating the amount of fuel gas supplied, in particular in dependence upon temperature. A valve housing (4) defines a gas passageway (5, 15, 16). A sealing element (6) and a partition wall (13) are received in the passageway (5, 15, 16). The sealing element (6) includes an elastic tongue (37). The partition wall (13) defines a gas orifice (17) corresponding to the elastic tongue (37). An actuator (7) includes a rod (8) with a tip (19) inserted through the gas orifice (17) for engagement with the elastic tongue (37). The tip (19) positions the elastic tongue (37) based on the temperature. However, the elastic tongue (37) can be broken due to fatigue.

The present invention is therefore intended to obviate or at least alleviate the problem encountered in the prior art.

SUMMARY OF INVENTION

It is the primary objective of the present invention to provide a durable heater.

According to the present invention, a heater includes a handle, a combustion chamber, a valve and a thermal controller. A reservoir for fuel can be installed in the handle. The combustion chamber is mounted on the handle. The valve is received in the handle. The valve defines a passage through which fuel can flow from the reservoir into the combustion chamber for combustion. The thermal controller includes a memory element at least partially received in the combustion chamber and a rod connected between the memory element and the valve for controlling a rate at which fuel can flow through the passage defined in the valve based on the temperature in the combustion chamber. The memory element is a helical memory metal element. The helical memory metal element shrinks or expands when the temperature increases above a certain value.

Other objectives, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings.

DETAILED DESCRIPTION OF EMBODIMENTS

Referring to FIGS. 1~7, according to a first embodiment of the present invention, a personal heater 10 includes a handle 14 that is hollow so as to receive a reservoir (not shown), a switch 11 movably mounted on the handle 14, a combustion chamber 12 mounted on the handle 14, a valve 20 received in the handle 14, a mechanical controller 60 via which the valve 20 is connected with the switch 11 and a thermal controller 70 engaged with the valve 20.

Figure 1:
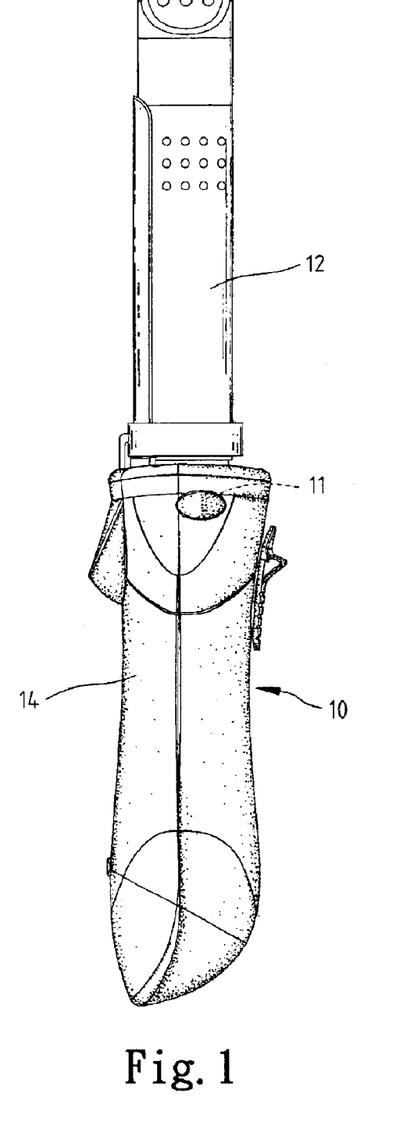
FIG. 1 is a front view of a personal heater equipped with a valve according to the present invention.
Figure 2:
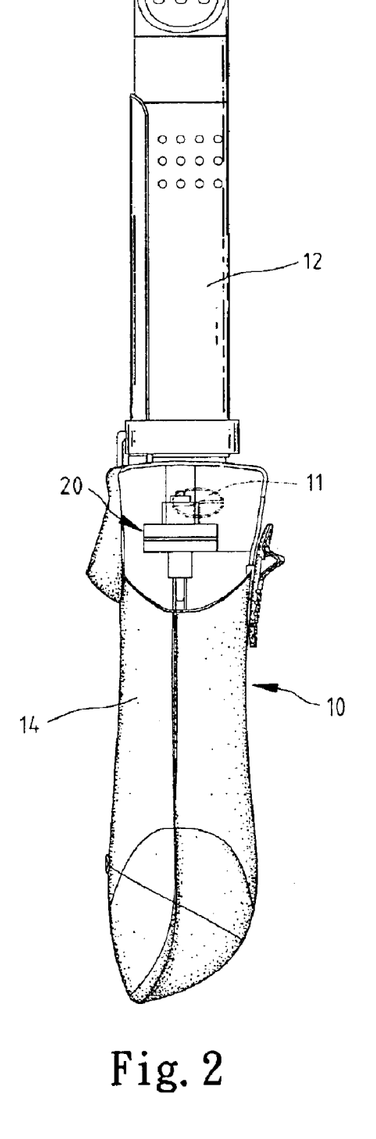
FIG. 2 is similar to FIG. 1 but showing a portion cut from the personal heater in order to show the valve.
Figure 3:
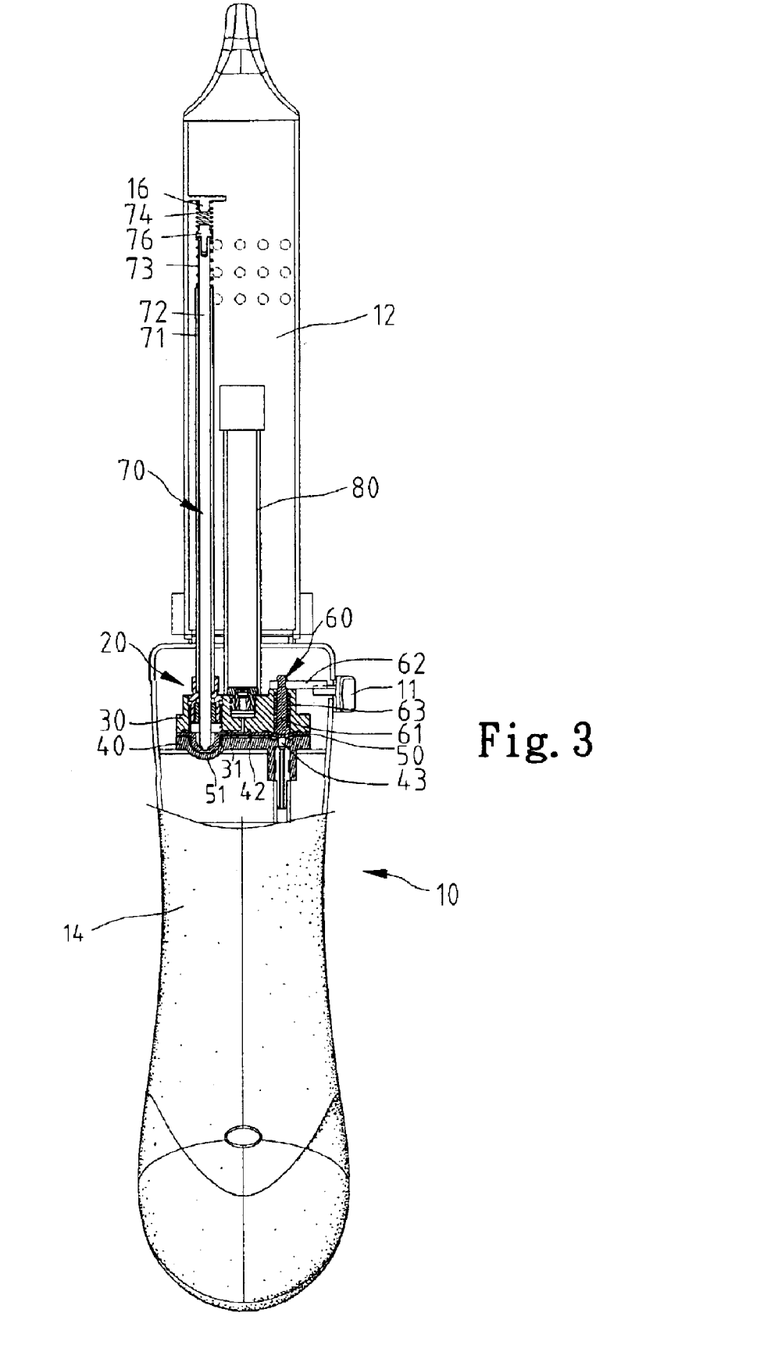
FIG. 3 is a side view of the personal heater of FIG. 1, showing a portion cut from the personal heater in order to show a valve according to a first embodiment of the present invention.
Figure 4:
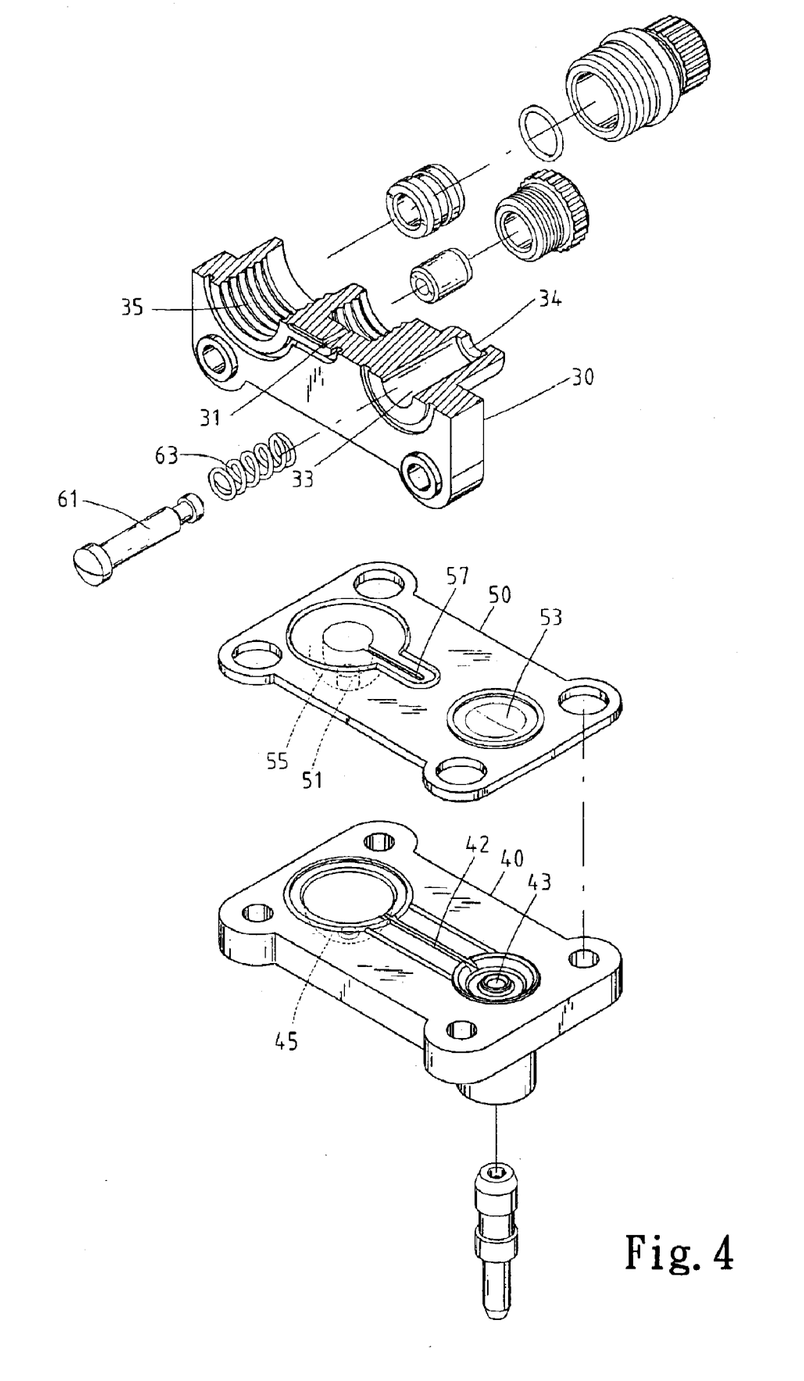
FIG. 4 is an exploded view of the valve of FIG. 3.

The valve 20 includes an upper shell 30, a lower shell 40 and a membrane 50 sandwiched between the upper shell 30 and the lower shell 40.

The upper shell 30 includes an upper face and a lower face. A hole 31 extends through the upper shell 30 from the lower face to the upper face. A pipe 80 includes a lower end inserted in the hole 31 and an upper end inserted in the combustion chamber 12. Thus, fuel can flow from a reservoir (not shown) into the combustion chamber 12 through the valve 20. A hole 33 extends through the upper shell 30 from the lower face to the upper face. The hole 33 includes a reduced upper end, thus forming an annular shoulder 34. A hole 35 extends through the upper shell 30 from the lower face to the upper face.

The mechanical controller 60 includes a rod 61, a beam 62 and a spring 63. The rod 61 includes an upper end and an enlarged lower end. The spring 63 is mounted on the rod 61. A substantial portion of the rod 61 is inserted in the hole 33 together with the spring 63. Thus, the spring 63 is compressed between the annular shoulder 34 and the enlarged lower end of the rod 61. The upper end of the rod 61 is located beyond the hole 33. The beam 62 includes a first end secured to the upper end of the rod 61 and a second end in engagement with the switch 11. In a conventional manner, the manipulation of the switch 11 causes movement of the beam 62 and the rod 61.

The membrane 50 includes a valve portion 53 corresponding to the hole 33 and a bowl-shaped portion 55 corresponding to the hole 35. The valve portion 53 includes a concave upper face and a convex lower face. The bowl-shaped portion 55 includes a concave upper face and a convex lower face. A hole 51 extends through the bowl-shaped portion 55. The membrane 50 includes an upper face and a lower face. A channel 57 is defined in the upper face of the membrane 50. A space defined in the bowl-shaped portion 55 is communicated with the channel 57.

The lower shell 40 includes an upper face and a lower face. A channel 42 is defined in the upper face of the lower shell 40. A hole 43 extends through the lower shell 40 from the lower face to the upper face. The lower shell 40 includes a bowl-shaped portion 45 with a concave upper face and a convex lower face. Via the channel 42, the hole 43 is communicated with a space defined in the bowl-shaped portion 45.

The membrane 50 is sandwiched between the upper shell 30 and the lower shell 40 and they are assembled. The valve portion 53 is located between the hole 33 and the hole 43. The bowl-shaped portion 55 is received in the bowl-shaped portion 45 so that the space defined therein is communicated with hole 35. The hole 31 is communicated with the channel 57.

The thermal controller 70 includes a sleeve 71 mounted on the upper shell 30 and a rod 72 inserted in the sleeve 71.

The rod 72 includes a lower end inserted in the hole 35 and an upper end located beyond the sleeve 71. A helical memory metal element 73 is mounted on the rod 72. A head 76 is secured to the upper end of the rod 72 so that the helical memory metal element 73 is compressed between the sleeve 71 and the head 76. A helical memory metal element 74 is compressed between the head 76 and a stop 16 formed on an internal face of the combustion chamber 12.

Figure 5:
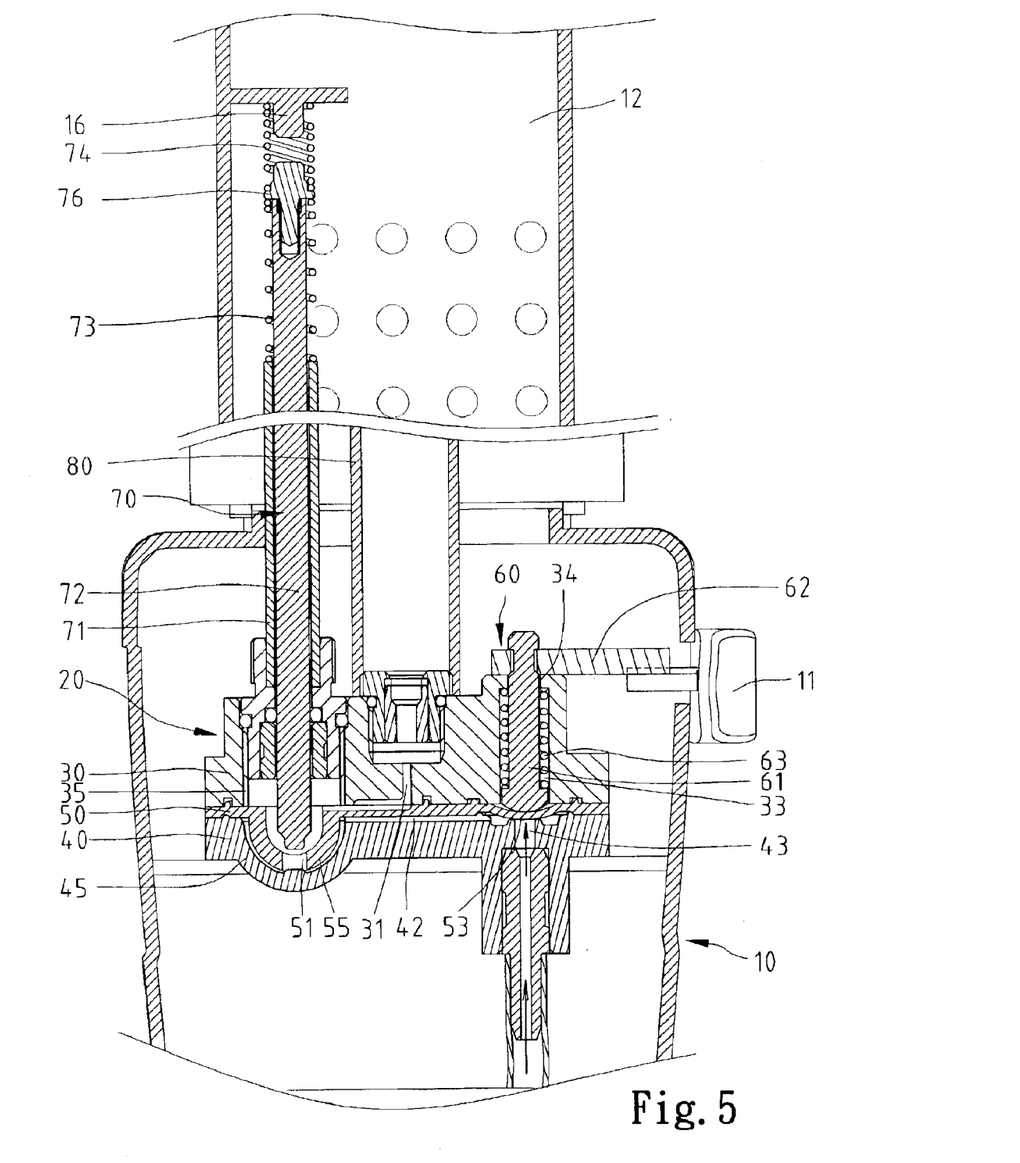
FIGS. 5~7 are cross-sectional views of the valve of FIG. 3 in various positions.

Referring to FIG. 5, the switch 11 is turned to OFF. Biased via the spring 63, the rod 61 presses the valve portion 53 so as to shut the hole 43. Thus, fuel does not flow from the reservoir into the valve 20.

Figure 6:
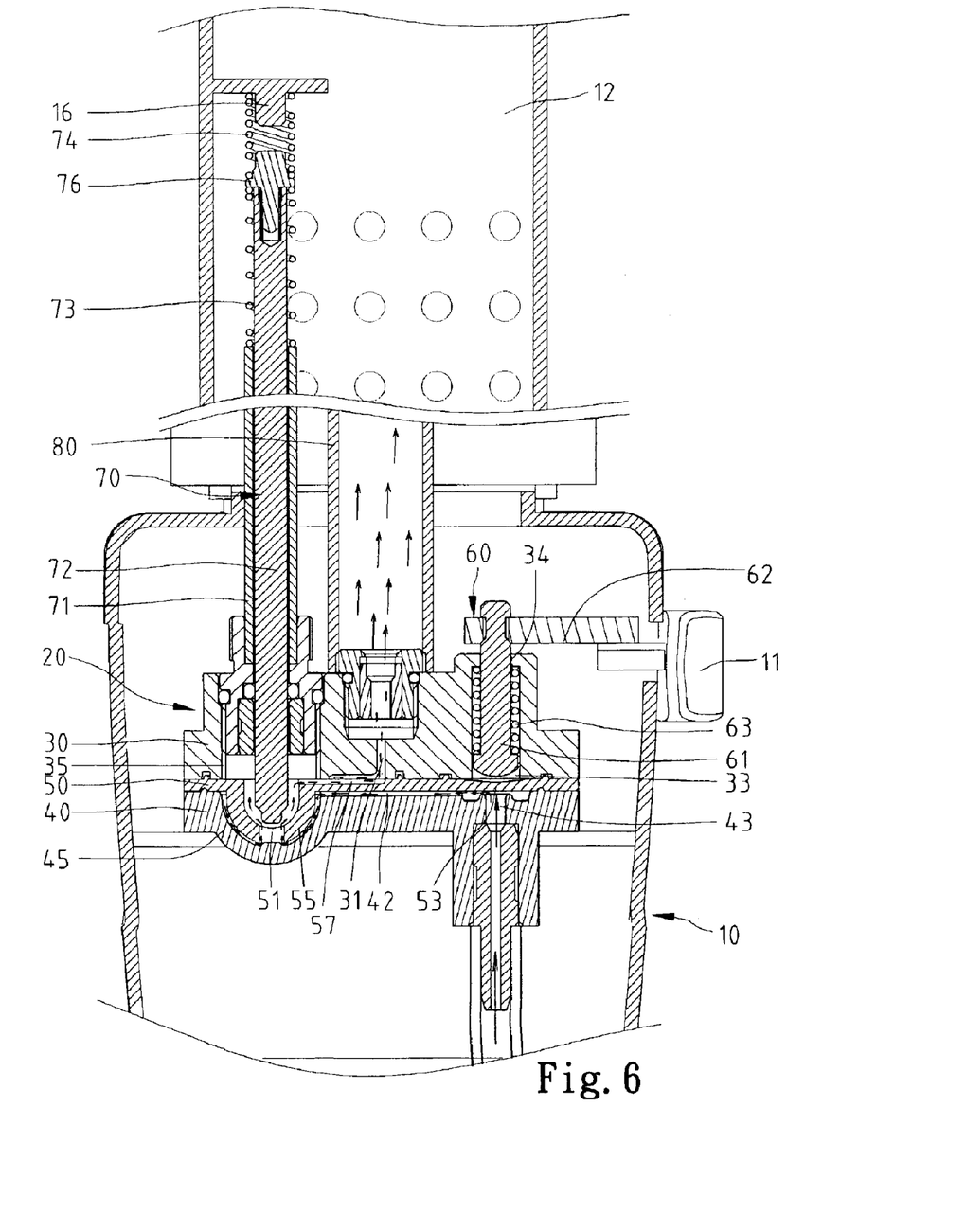

Referring to FIG. 6, the switch 11 is turned to ON. Lifted via the switch 11, the rod 61 releases the valve portion 53 so as to open the hole 43. Thus, fuel flows from the reservoir into the valve 20. Through the channel 42, fuel flows from the hole 43 to the space defined in the bowl-shaped portion 45. Through the hole 51, fuel flows from the space defined in the bowl-shaped portion 45 to the space defined in the bowl-shaped portion 55. Through the channel 57, fuel flows from the space defined in the bowl-shaped portion 55 to the hole 31. Through the pipe 8, fuel flows from the hole 31 into the combustion chamber 12 for combustion.

When the combustion begins, the temperature in the combustion chamber 12 is not increased significantly. The helical memory metal element 73 does not substantially shrink. The helical memory metal element 74 does not substantially expand. A gap between the lower end of the rod 72 and the bottom of the bowl-shaped portion 55 is at its substantially maximum value. Thus, fuel can flow through this gap at a substantially maximum rate.

Figure 7:
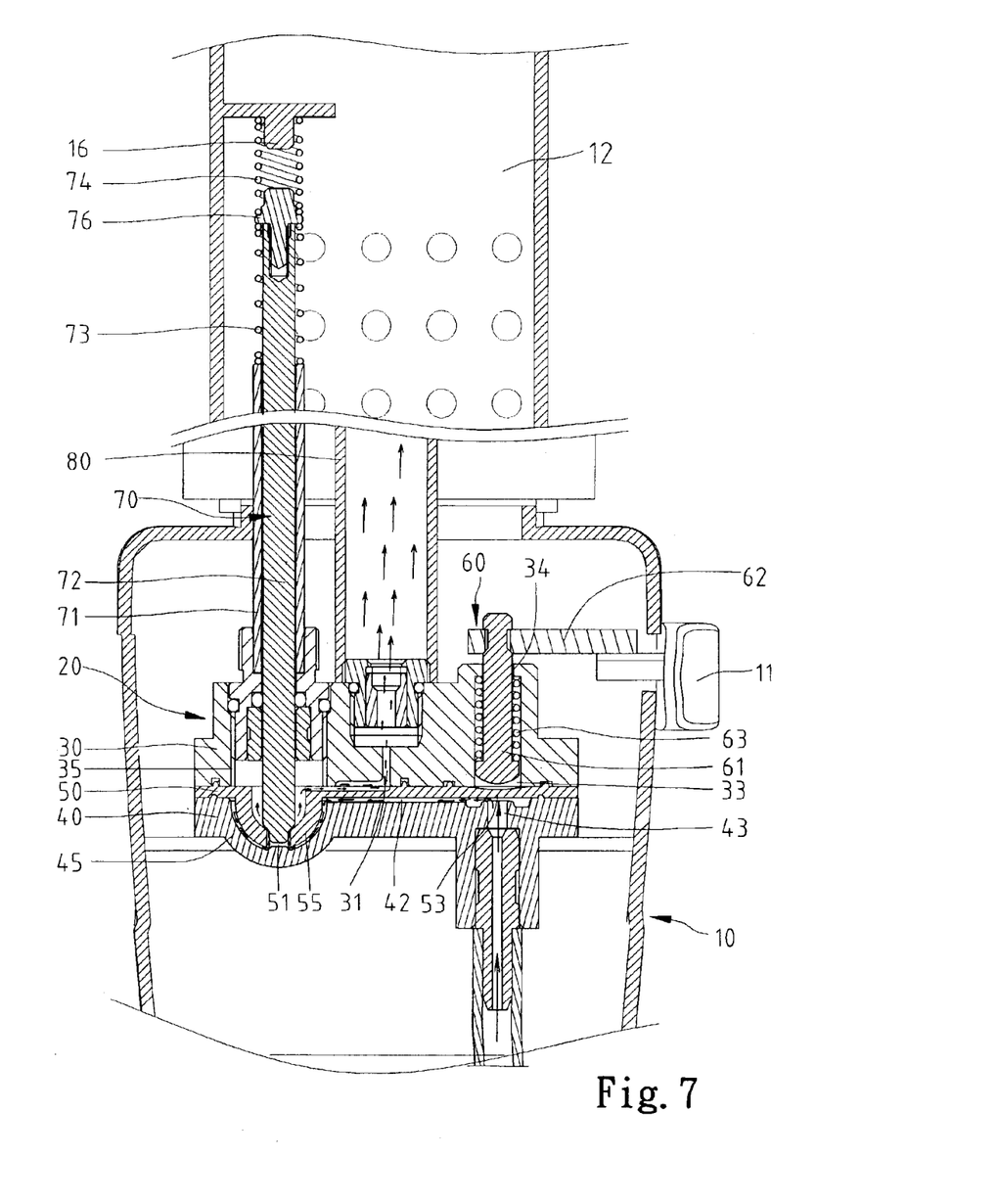

Referring to FIG. 7, when the combustion continues in the combustion chamber 12 for some time, the temperature increases in the chamber 12. The helical memory metal element 73 shrinks while the helical memory metal element 74 expands. The rod 72 is moved down so that the gap between the lower end of the rod 72 and the bottom of the bowl-shaped portion 55 is reduced. Thus, fuel flows through this gap at a reduced rate, and the combustion continues at a reduced scale.

When the switch 11 is turned to OFF, fuel is not allowed to enter the combustion chamber 12. Thus, the combustion is ceased. Accordingly, the temperature decreases in the combustion chamber 12. Inherently, the helical memory metal element 73 expands while the helical memory metal element 74 shrinks. The helical memory metal elements 73 and 74 return to their original positions as the temperature decreases to a certain value in the combustion chamber 12.

Figure 8:
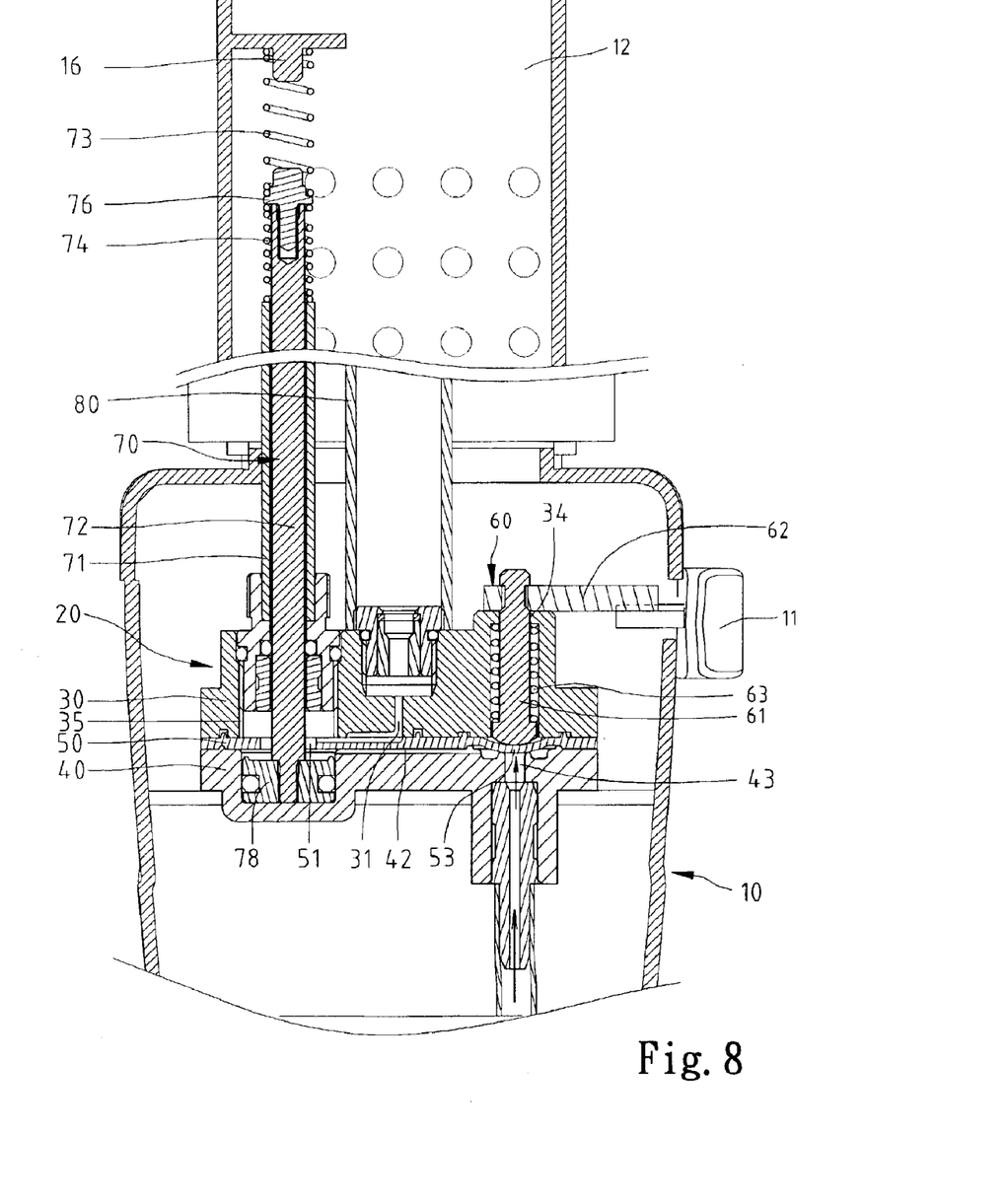
FIGS. 8~10 are cross-sectional views of a valve in various positions according to a second embodiment of the present invention.
Figure 9:
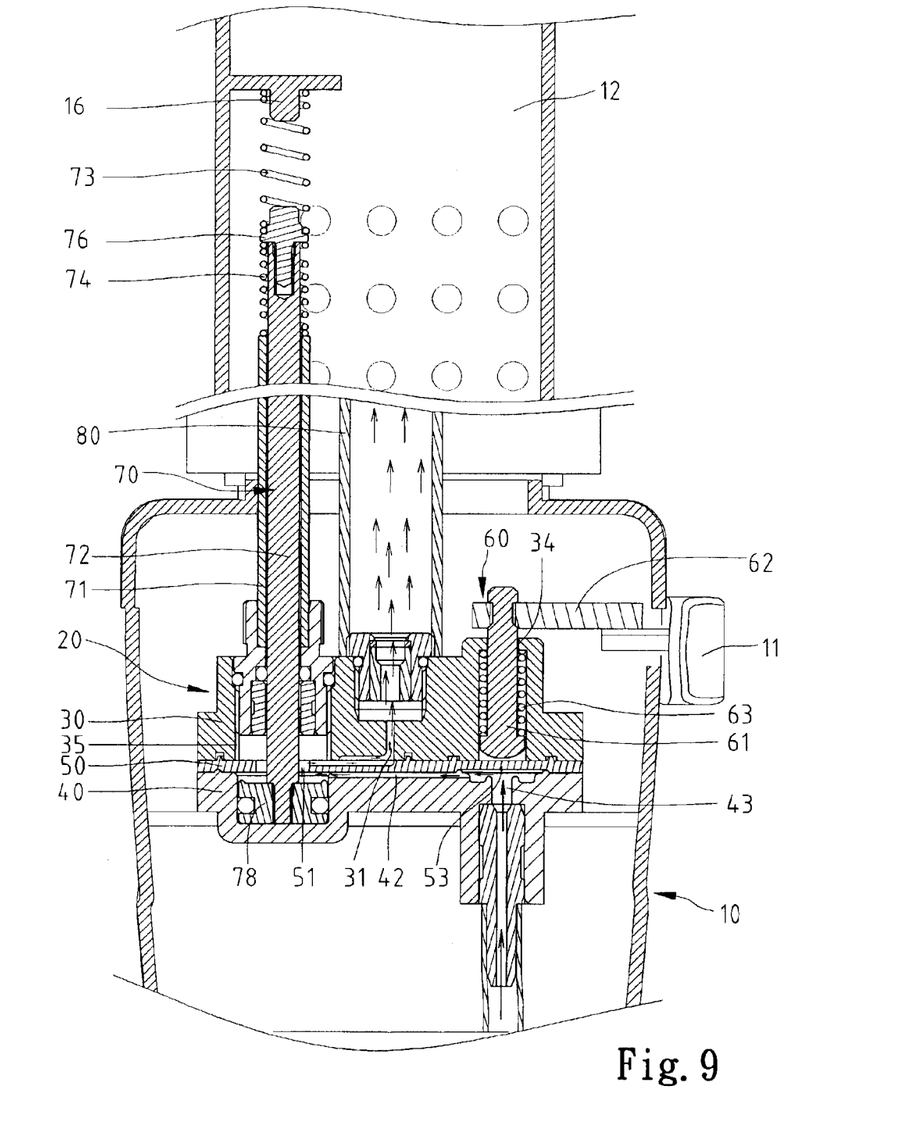
Figure 10:
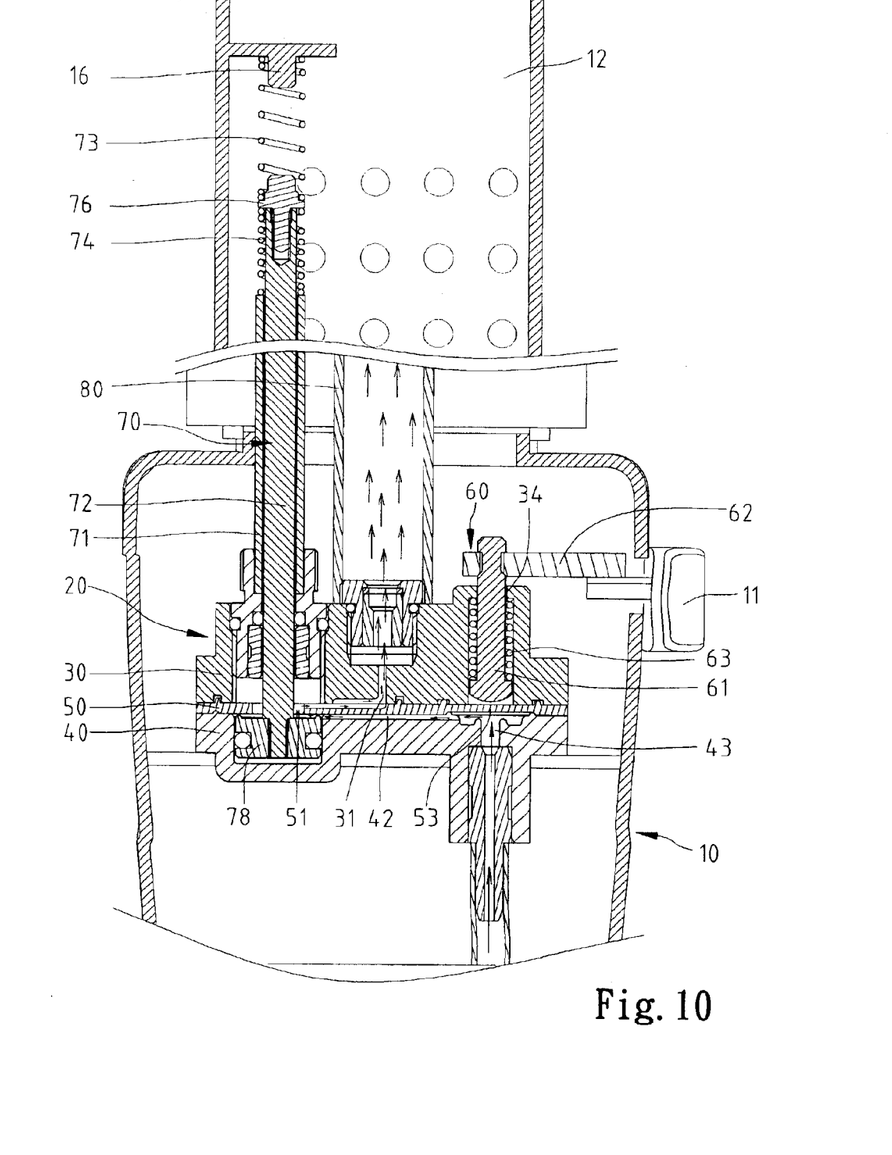

FIGS. 8–10 show a valve according to a second embodiment of the present invention. The second embodiment is different from the first embodiment in that the helical memory metal element 73 is located above the head 76 and the helical memory metal element 74 is located below the head 76 and that a head 78 is attached to the lower end of the rod 72 and located below the membrane 50. Thus, the helical memory metal elements 73 and 74 lift the rod 72 when the temperature increases in the combustion chamber 12. Accordingly, a gap between the head 78 and the membrane 50 is reduced.

Referring to FIG. 8, the switch 11 is turned to OFF. Biased via the spring 63, the rod 61 presses the valve portion 53 so as to shut the hole 43. Thus, fuel does not flow from the reservoir into the valve 20.

Referring to FIG. 9, the switch 11 is turned to ON. Lifted via the switch 11, the rod 61 releases the valve portion 53 so as to open the hole 43. Thus, fuel flows from the reservoir into the valve 20. Via the channel 42, fuel flows from the hole 43 to the gap between the head 78 and the membrane 50. Via the hole 51 and the channel 57, fuel flows from the gap between head 78 and the membrane 50 to the hole 31. Via the pipe 80, fuel flows from the hole 31 into the combustion chamber 12 for combustion.

When the combustion begins, the temperature in the combustion chamber 12 is not increased significantly. The helical memory metal element 73 does not substantially shrink. The helical memory metal element 74 does not substantially expand. The gap between the bead 78 and the membrane 50 is at its substantially maximum value. Thus, fuel can flow through this gap at a substantially maximum rate.

Referring to FIG. 10, when the combustion continues in the combustion chamber 12 for some time, the temperature increases in the chamber 12. The helical memory metal element 73 shrinks while the helical memory metal element 74 expands. The rod 72 is lifted so that the gap between the head 78 and the membrane 50 is reduced. Thus, fuel flows through this gap at a reduced rate, and the combustion goes at a reduced scale.

The present invention has been described through illustration of some embodiments thereof. After a study of this specification, those skilled in the art can derive various variations from the embodiments. Therefore, the embodiments are only taken as examples and shall not limit the scope of the present invention that is defined in the following claims.

What is claimed is:

1. A heater including:
   a handle;
   a combustion chamber mounted on the handle;
   a valve received in the handle, the valve defining a passage through which fuel can flow from a reservoir received in the handle into the combustion chamber for combustion;
   a thermal controller including a memory element at least partially received in the combustion chamber and a rod connected between the memory element and the valve for controlling a rate at which fuel can flow through the passage defined in the valve based on the temperature in the combustion chamber; and
   a second memory element connected with the rod opposite to the first memory element wherein the memory elements are deformed in opposite directions when the temperature increases above a certain value.

2. The heater according to claim 1 wherein each of the first memory element and the second memory element is a memory metal element.

3. The heater according to claim 2 wherein the memory metal element is a helical memory metal element.

4. The heater according to claim to claim 1 wherein the first memory element shrinks when the temperature increases above a certain value.

5. The heater according to claim 1 wherein the first memory element expands when the temperature increases above a certain value.

6. The heater according to claim 1 wherein the valve includes an upper shell on which the rod is movably mounted, a lower shell and a membrane sandwiched between the upper shell and the lower shell for engagement with the rod.

7. The heater according to claim 6 wherein the passage is defined between the upper shell and the membrane.

8. The heater according to claim 7 wherein the first memory element moves the rod towards an upper face of the membrane.

9. The heater according to claim 6 wherein the passage is defined between the lower shell and the membrane.

10. The heater according to claim 9 wherein the first memory element moves the rod towards a lower face of the membrane.

11. The heater according to claim 10 wherein the thermal controller includes a head of a size large than the rod and attached to and movable with a lower end of the rod, with the lower end of the rod extending through the hole, with the head located on an opposite side of the membrane than the memory element.

12. The heater of claim 1 further including a stop mounted to and within the combustion chamber, with the second memory element sandwiched between the rod and the stop.

13. A valve including:

an upper shell;

an lower shell;

a membrane sandwiched between the upper shell and the lower shell, the membrane defines a hole;

an upper passage defined between the upper shell and the membrane;

a lower passage defined between the lower shell and the membrane and communicated with the upper passage through the hole defined in the membrane; and a thermal controller including a memory element at least partially received in a combustion chamber and a rod extending from the memory element to the membrane for controlling a rate at which fuel can flow through one of the passages based on the temperature in the combustion chamber, wherein the memory element moves the rod towards an upper face of the membrane for controlling the upper passage, with the lower shell including a bowl-shaped portion having a concave upper face, with the lower passage in communication with a space defined by the concave upper force of the bowl-shaped portion, with the membrane including a bowl-shaped portion for receipt in the bowl-shaped portion of the lower shell, with the upper face of the membrane inside the bowl-shaped portion being concave, with the hole extending through the bowl-shaped portion of the membrane, with the upper passage in communication with a space defined in the upper face of the bowl-shaped portion of the membrane, with the rod extending into the bowl-shaped portion of the membrane towards the hole to create an adjustable gap between a lower end of the rod and the upper face of the bowl-shaped portion of the membrane.

14. The valve according to claim 13 further including:

a fuel hole formed in the lower shell through which fuel can flow from a reservoir and in communication with the lower passage; and a mechanical controller for allowing flow from the fuel hole into the lower passage and for stopping flow from the fuel hole into the lower passage.

15. A valve including:

an upper shell;

a lower shell;

a membrane sandwiched between the upper shell and the lower shell, the membrane defines a hole;

an upper passage defined between the upper shell and the membrane;

a lower passage defined between the lower shell and the membrane and communicated with the upper passage through the hole defined in the membrane; and a thermal controller including memory element at least partially received in a combustion chamber and a rod extending from the memory element to the membrane for controlling a rate at which fuel can flow through one of the passages based on the temperature in the combustion chamber, wherein the memory element moves the rod towards a lower face of the membrane for controlling the lower passage, wherein the thermal controller includes a head of a size larger than the hole and attached to and movable with a lower end of the rod, with the lower end of the rod extending through the hole, with the head located on an opposite side of the membrane than the memory element.

16. The valve according to claim 15 wherein the memory element is a memory metal element.

17. The valve according to claim 16 wherein the memory metal element is a helical memory metal element.

18. The valve according to claim 15 wherein the memory element shrinks when the temperature increases above a certain value.

19. The valve according to claim 15 wherein the memory element expands when the temperature increases above a certain value.

* * * * *